H. N. ANDERSON.
GEAR ROLLING MACHINE.
APPLICATION FILED JULY 26, 1915.
1,240,916.
Patented Sept. 25, 1917.
9 SHEETS—SHEET 2.
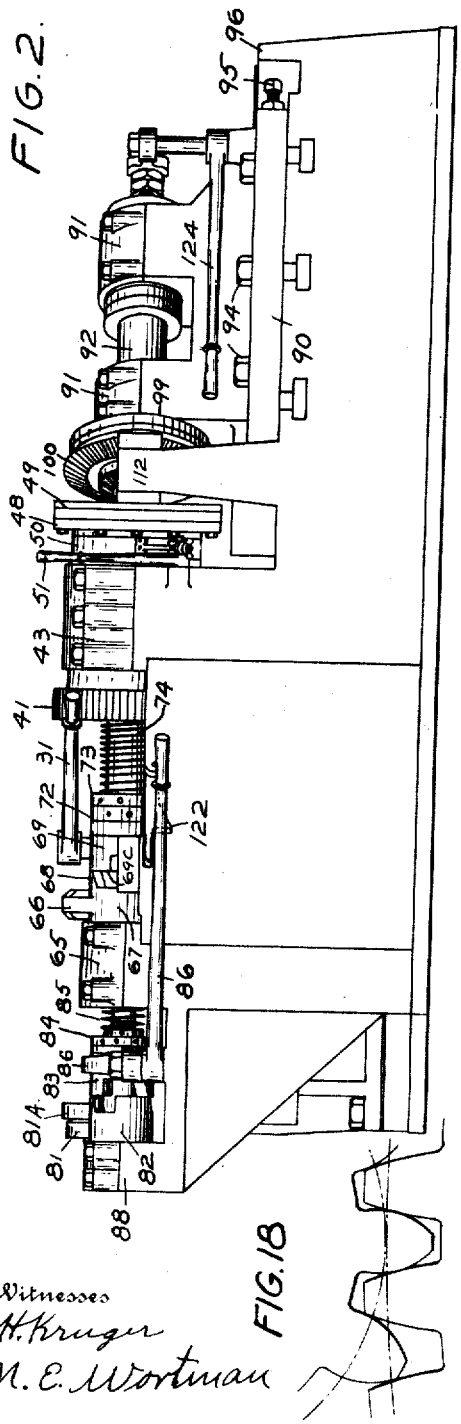
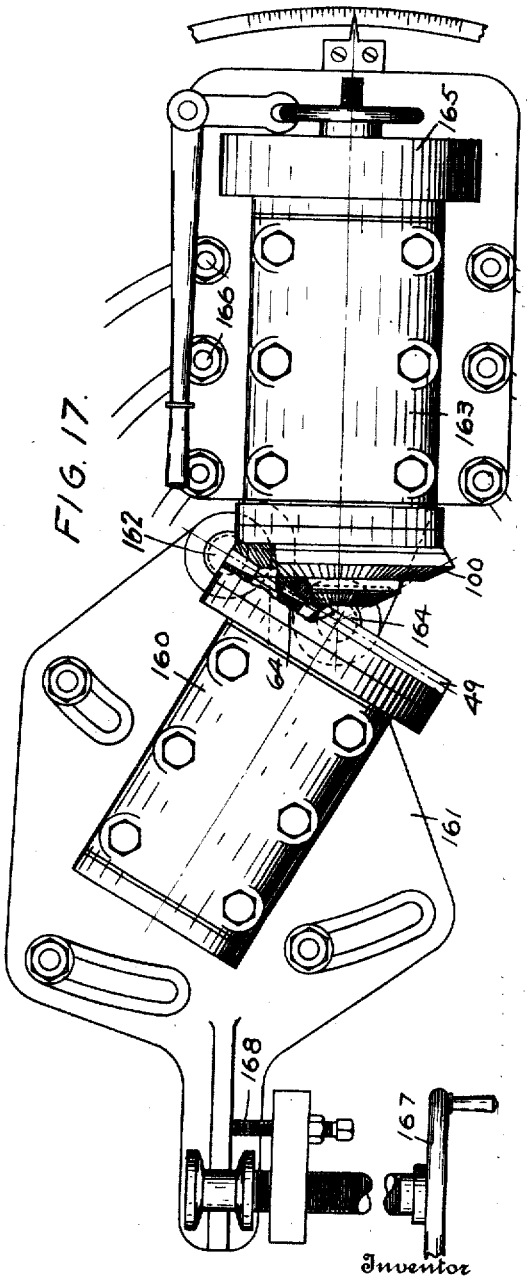
Witnesses
C. H. Kruger
M. E. Wortman
Inventor
Harold N. Anderson,
By
Kerr, Page, Cooper & Hayward,
Attorneys

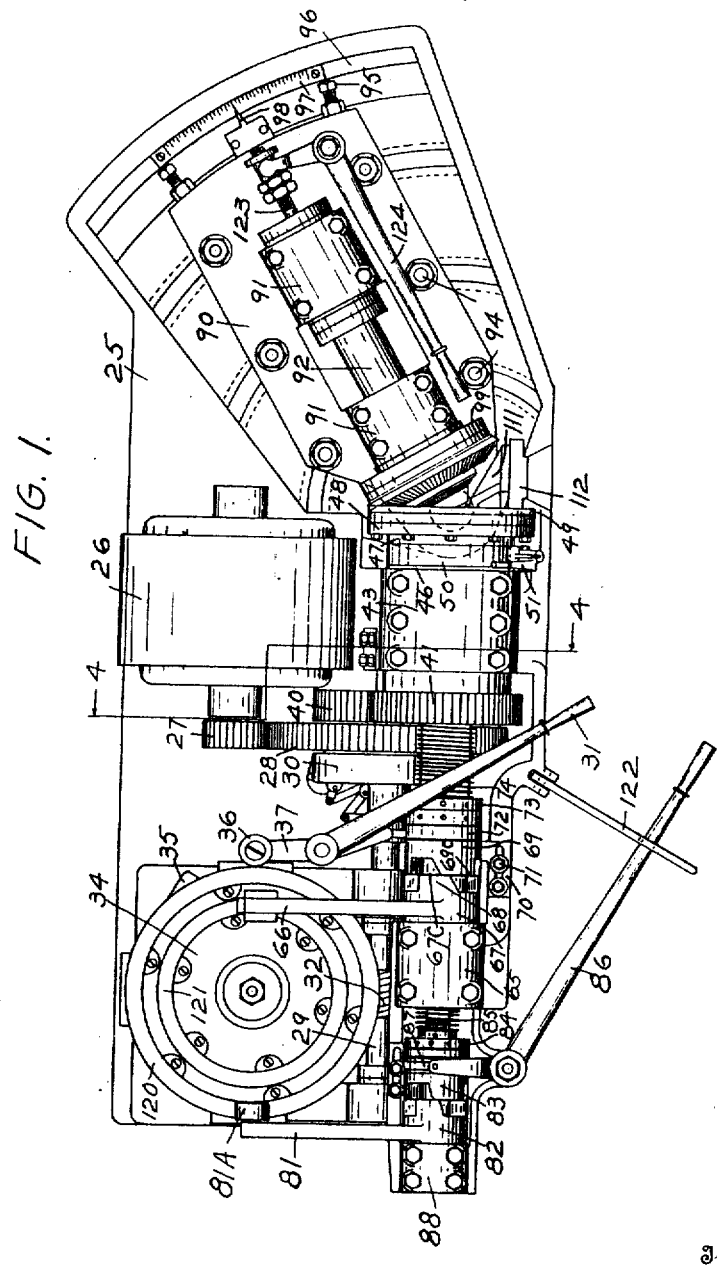

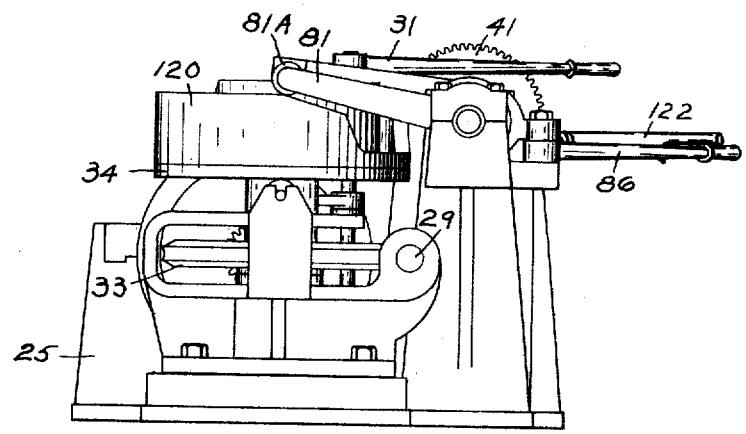
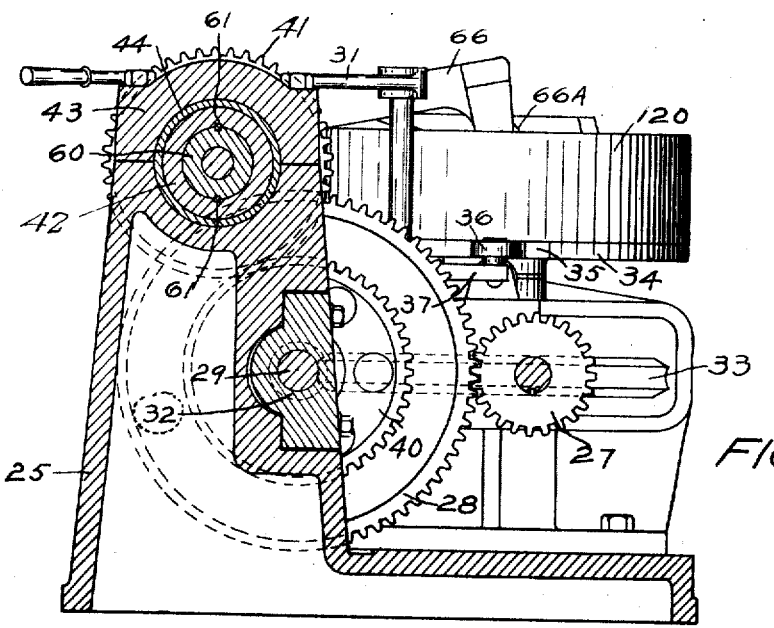

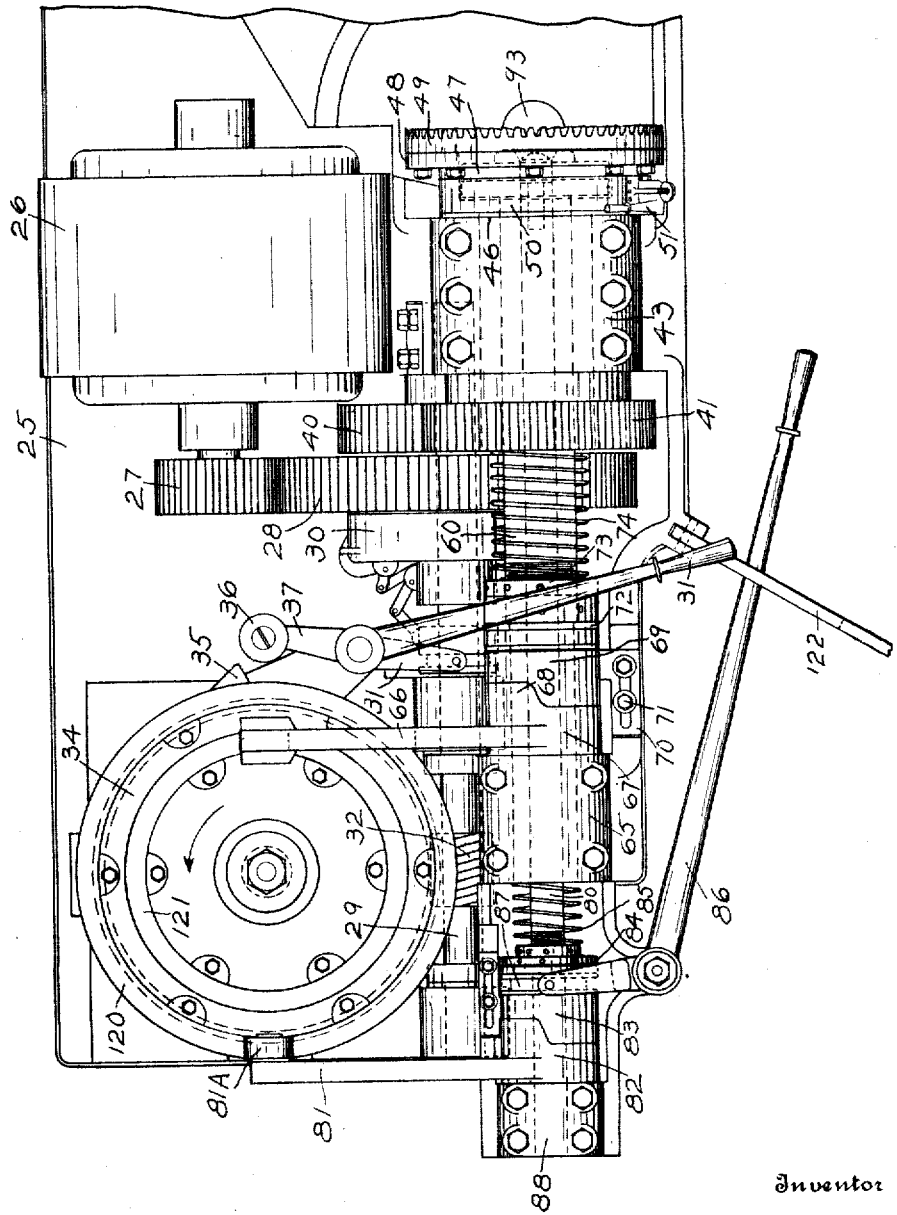

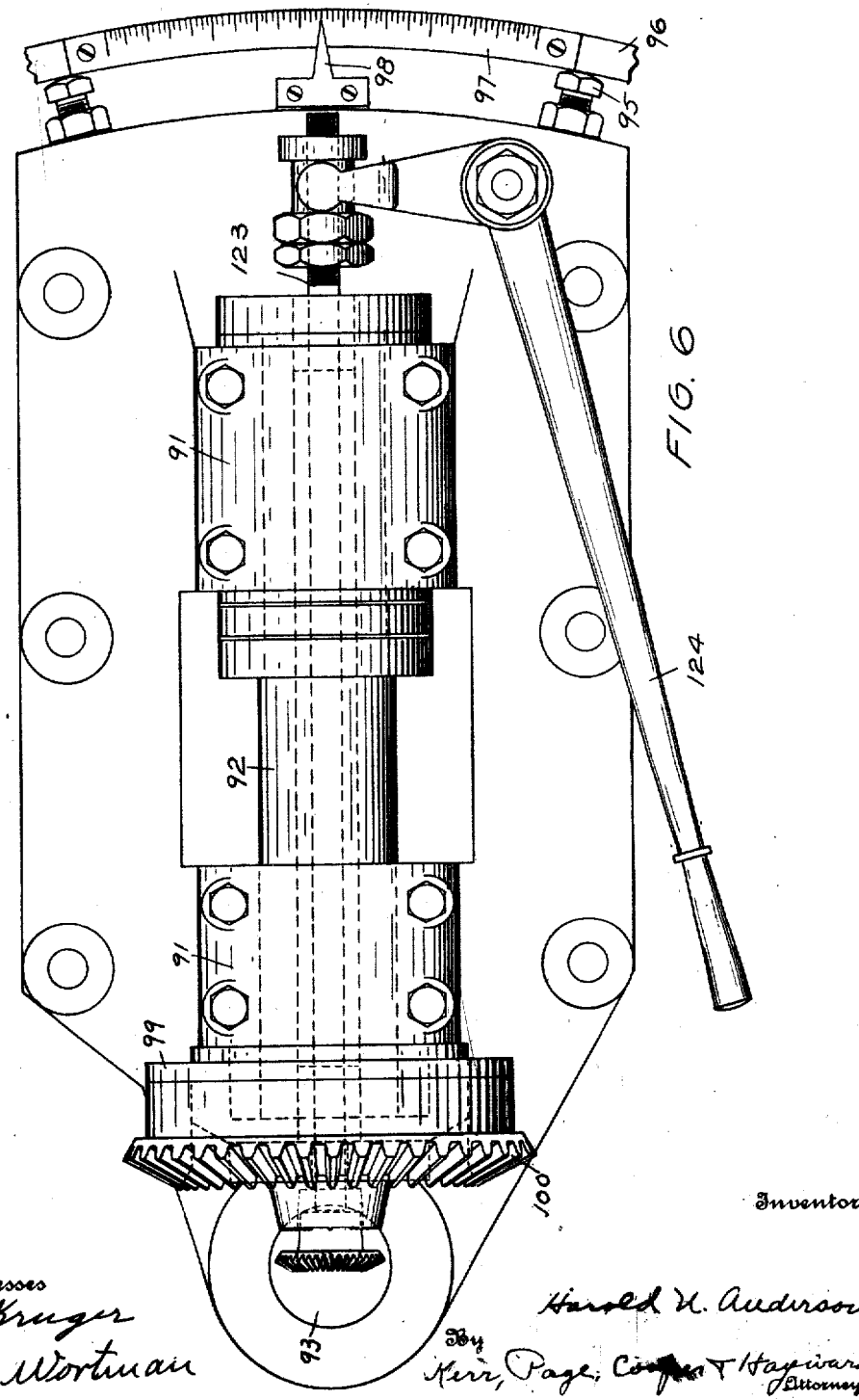

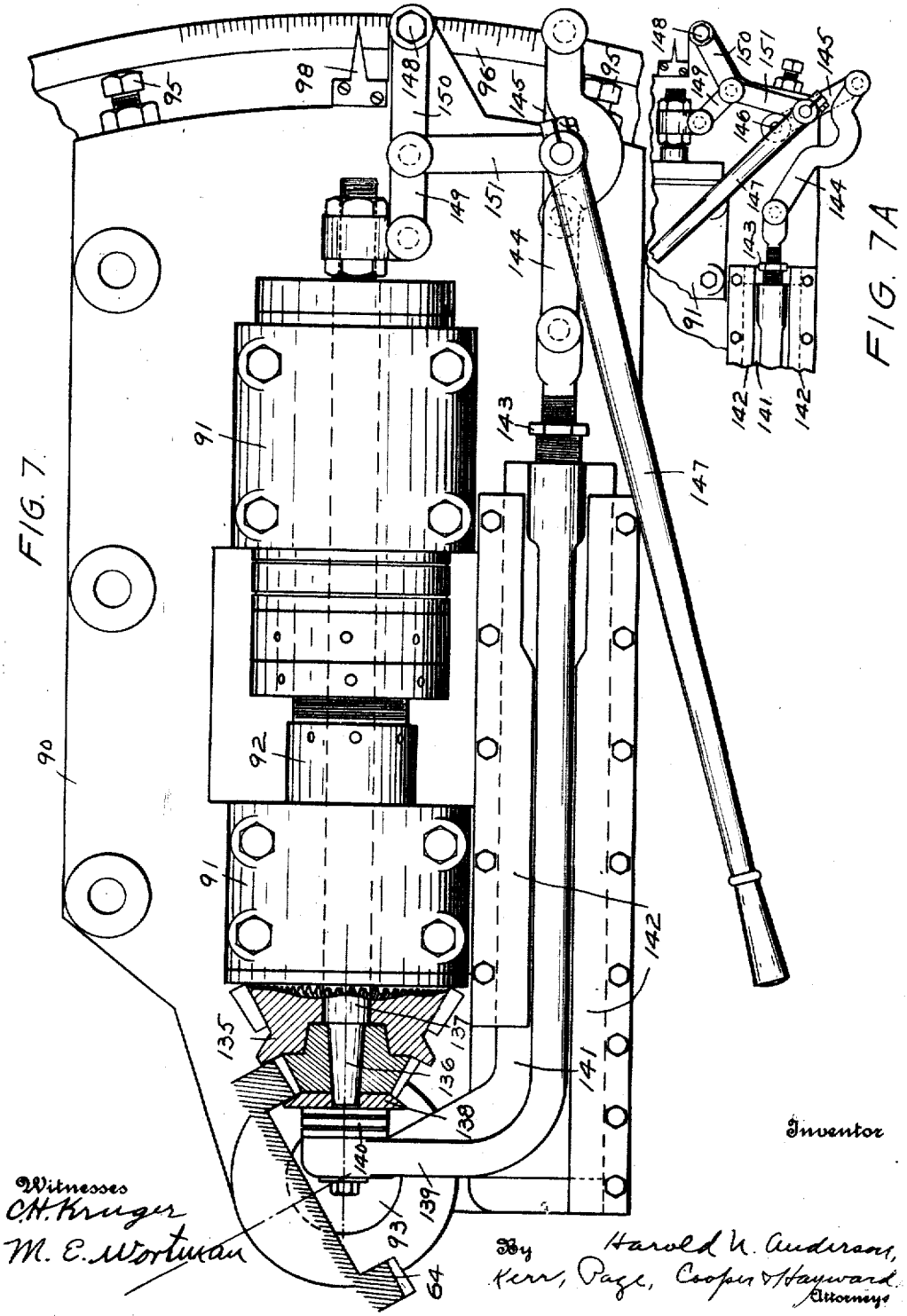

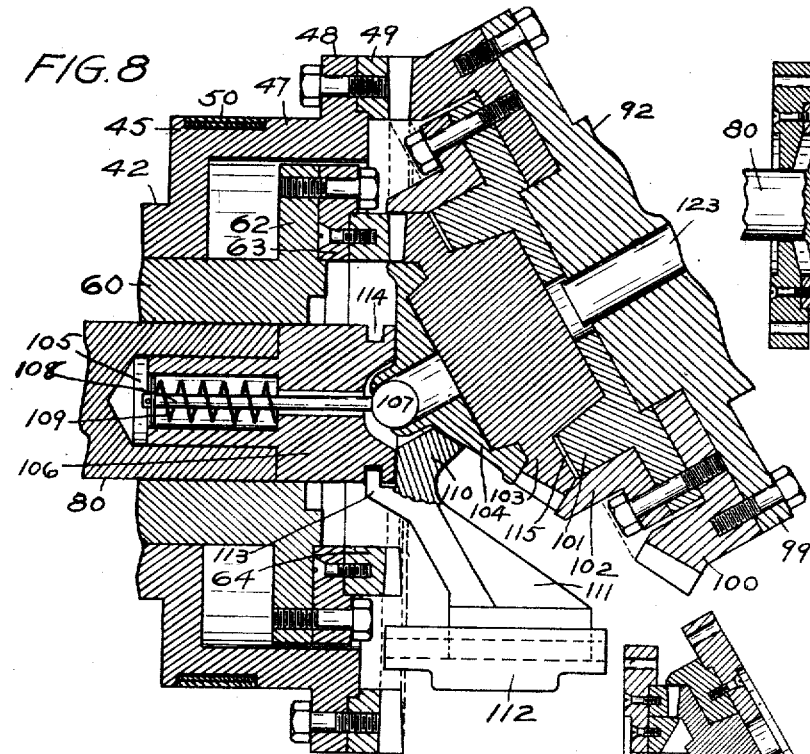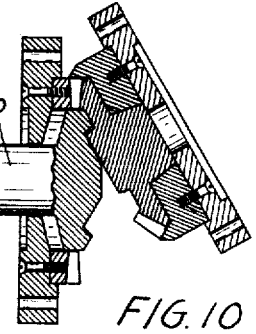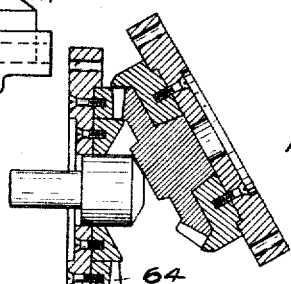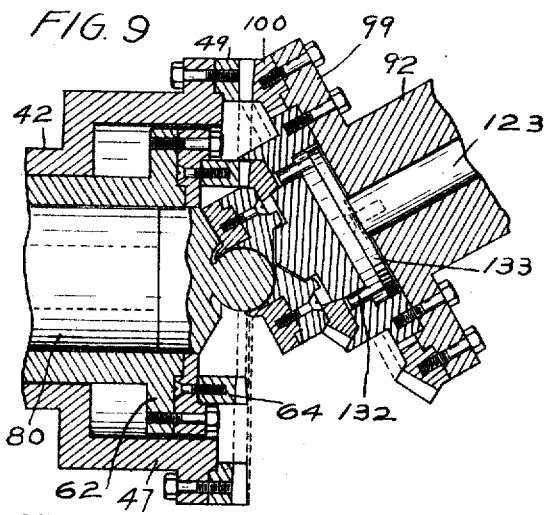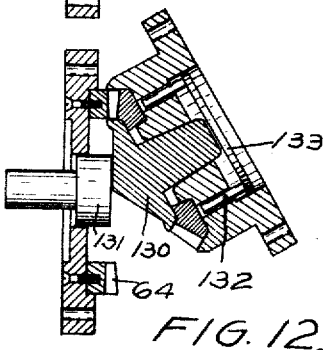

H. N. ANDERSON.
GEAR ROLLING MACHINE.
APPLICATION FILED JULY 26, 1915.
1,240,916.
Patented Sept. 25, 1917.
9 SHEETS—SHEET 8.
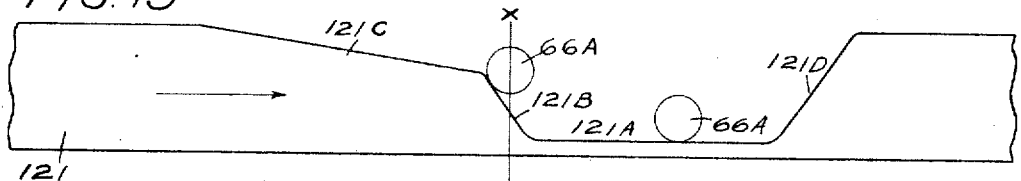
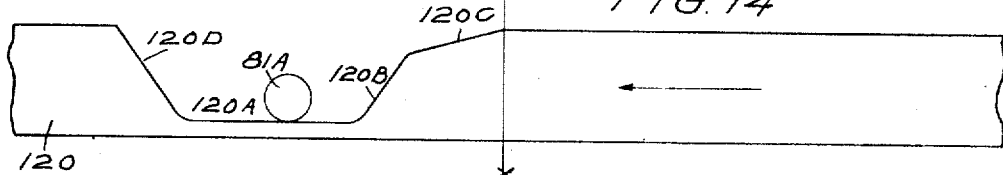
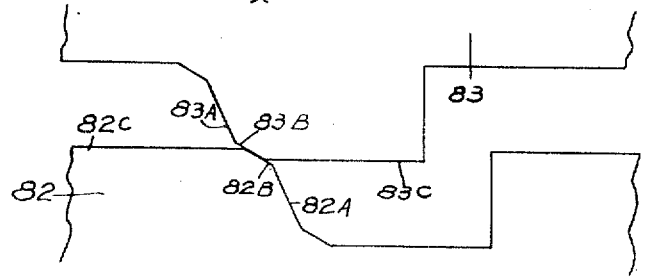
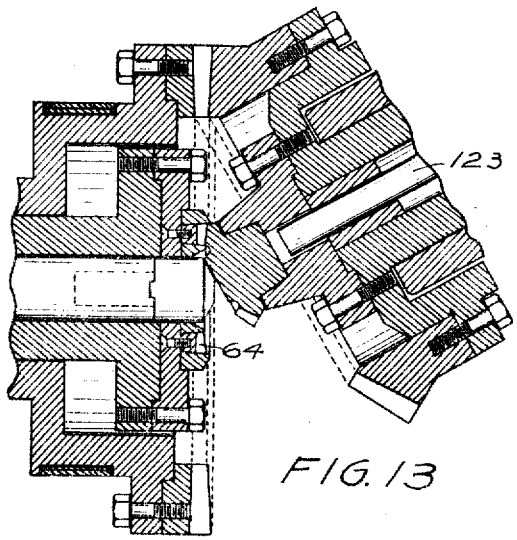
Witnesses
C. H. Kruger
M. E. Wortman
Inventor
Harold N. Anderson,
By Kerr, Page, Cooper & Hayward,
Attorneys

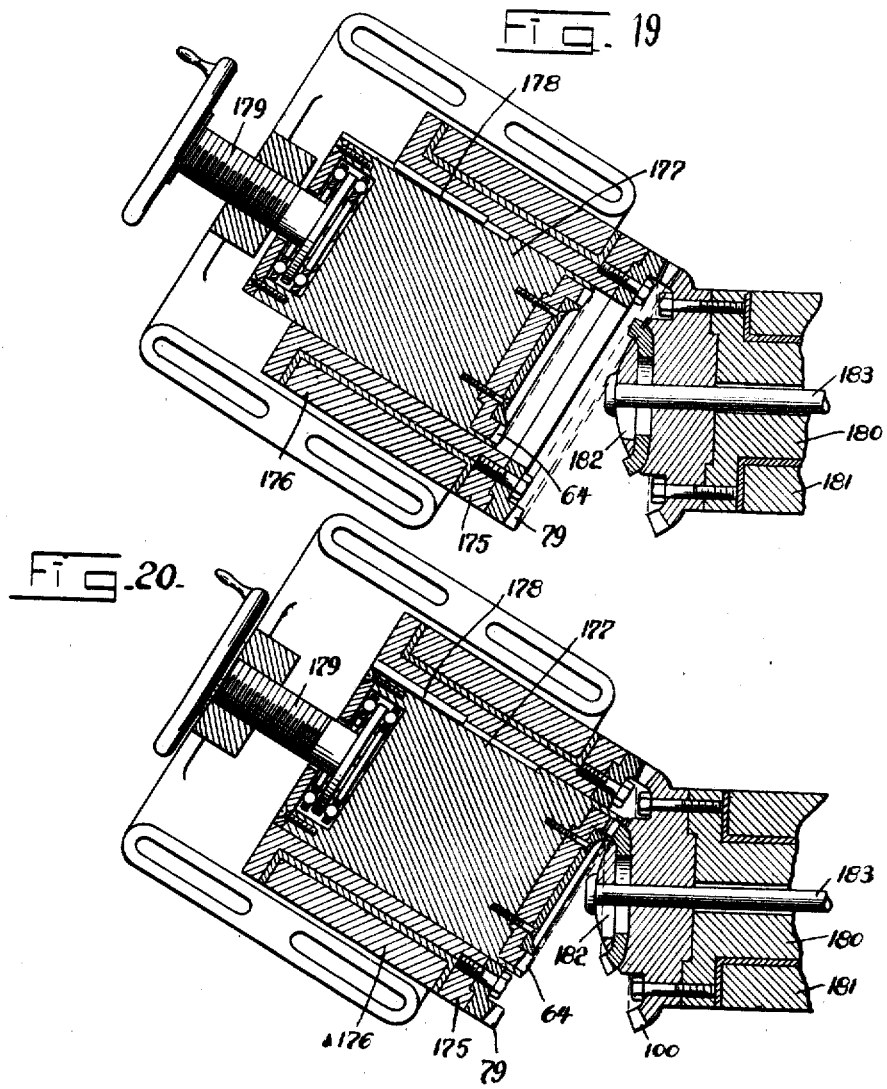

UNITED STATES PATENT OFFICE.

HAROLD N. ANDERSON, OF CLEVELAND, OHIO, ASSIGNOR TO THE ANDERSON ROLLED GEAR COMPANY, OF CLEVELAND, OHIO, A CORPORATION OF OHIO.

GEAR-ROLLING MACHINE.

1,240,916. Specification of Letters Patent. Patented Sept. 25, 1917.

Application filed July 26, 1915. Serial No. 41,857.

*To all whom it may concern:*

Be it known that I, HAROLD N. ANDERSON, a citizen of the United States, residing at Cleveland, county of Cuyahoga, State of Ohio, have invented certain new and useful Improvements in Gear-Rolling Machines, of which the following is a full, clear, and exact description.

This invention is related to my application Serial No. 800,251 and to two divisions which have been carved therefrom, Serial Nos. 55,976 and 55,977. Each of these shows machines for rolling bevel gears, having certain common characteristics; for example shrouds which confine the die-roll teeth. It is also related to my application Serial No. 643,010, in that the die-roll has certain characteristics found in a rectilineal rack; it is in fact what is often referred to as a circular rack, though more commonly known as a crown gear. Serial No. 800,251, as now constituted, discloses both a conical and a crown die-roll arranged to approach the blank longitudinally; it also contains generic claims for a gear rolling machine embodying a longitudinally movable die roll. In the present application I claim broadly a gear rolling machine having a longitudinally movable crown die-roll.

The valuable qualities of rolled gears have been pointed out in one or more of the above mentioned applications, so it is unnecessary to do so here.

One of the principal objects of the present invention is to insure uniform treatment of the blanks by providing automatic mechanism for clamping the blank in the holder, pressing the rotating die-roll into the blank at a definite velocity, suspending the pressure and allowing the die-roll and blank to rotate together for a definite period of time, withdrawing the die-roll, releasing the blank and stopping its rotation. The mechanism is timed so as to complete the cycle of operation while the blank completes a given number of revolutions. This automatic control is an improvement over the structure disclosed in said application Serial No. 851,275, among other respects, in that the die may be pressed into the blank at any predetermined velocity relative to the velocity of rotation of the die and blank, while the former structure does not possess this universality of adaptation. In both devices, however, the teeth are sunk into the blank while it turns a given number of revolutions and this is the subject of broad claims in said application Serial No. 851,275.

Another principal object is to give the die-roll a certain universality of adaptation. By moving the die-roll longitudinally to press it into the blank it is enabled to roll teeth having various characteristics. Being a crown gear the die-roll is capable of rolling any bevel gear of its pitch and radius, from one having the largest number of teeth possible in a bevel gear not a crown gear to a pinion having the fewest possible teeth. This universality is made available by a swiveled mounting for the blank which permits of any angle between the die-roll and blank axes.

Another principal object is to avoid moving the timing gears in bringing the die-roll into action. The timing gears, one of which is a crown gear, are properly enmeshed to a desired depth and remain so all the while the die-roll operates on the blank. The angle formed by the axis of the die-roll with that of the blank remains fixed while the teeth are formed.

Another principal object is to fill out the teeth at their extremities. This is done by confining the tooth receiving part of the blank between shrouds. Means are provided for doing this without impeding insertion and removal of the blanks.

Other objects are to provide extracting devices for the blanks when completed, and to improve generally upon machines for rolling gears.

In the accompanying drawings:

Figure 1 is a plan of the machine in operation.

Fig. 2 is a front elevation of the machine when in operation.

Fig. 3 is an elevation of the left end.

Fig. 4 is a sectional elevation on line 4, Fig. 1.

Fig. 5 is an enlarged view of the die-roll end of the machine.

Fig. 6 is an enlarged plan view of the blank carriage shown at the right in Fig. 1, showing the operation of the blank extractor.

Fig. 7 is a view of a modified form of carriage.

Fig. 7ᴬ is a detail showing parts of Fig. 7 in a different position.

Fig. 8 is a sectional plan of the timing gears, blank holder, die-roll, etc.

Fig. 9 is a similar view of a modified structure.

Figs. 10, 11 and 12 are sectional plan views of three different blank clamping and shrouding devices.

Fig. 13 is a sectional plan of the timing gears and blank holder, with a shrouded die-roll.

Fig. 14 is a diagrammatic plan of the controlling cam for the die roll;

Fig. 15 is a similar view of the controlling cam for the blank holder, and

Fig. 16 is a diagrammatic view of one of the pressure cams.

Fig. 17 is a plan of a modified structure in which the power is applied at the blank end of the machine and the die-roll is swung on a pivot instead of moved longitudinally.

Fig. 18 is a diagrammatic illustration of the "long and short addendum."

Fig. 19 shows a modified form of gear rolling machine in which the die-roll is manually advanced longitudinally.

Fig. 20 shows the same device with the die in contact with the blank.

Similar numerals refer to like parts in all of the views.

Referring to the drawings, 25 indicates the base, which carries a motor 26 whose pinion 27 meshes with a gear 28 carried by a shaft 29 mounted in bearings also carried by base 25. Gear 28 is loosely mounted upon shaft 29 and is connected thereto when desired by a clutch 30. This clutch is thrown in by means of a shifting lever 31 in the usual way. A worm 32 carried by shaft 29 meshes with a worm wheel 33 and drives the timing wheel 34. Fig. 5 shows the normal position of this wheel when at rest. The motor is normally running and when the operator wishes to start the machine he throws in the clutch with the lever 31 which starts the shaft 29 to rotating and driving the timing wheel in the direction shown in Fig. 5. The motor continues to run until the lug 35 on the timing wheel engages the roller 36 on the end of an arm 37 extending from the shifting lever 31 and throws out the clutch. The timing wheel therefore rotates once and then stops the motor. The parts have sufficient momentum to carry the lug 35 past the roller, so as not to interfere with the succeeding operation of the shifting lever.

A gear 40 is rigidly secured to shaft 29 and meshes with a gear 41 rigidly secured to a hollow shaft 42 (see Figs. 4 and 5) which rotates in a bearing 43, said bearing having a suitable bushing 44. The other end of shaft 42 is enlarged and forms a shoulder 45 which bears against the flange 46 on the end of bushing 44. The enlarged part or head of the shaft, indicated by 47, is hollow and has an outwardly extending flange 48 to which is bolted the crown gear 49. A band brake 50 surrounds the head 47 and is operated by a lever 51.

A hollow shaft 60 is arranged to slide longitudinally in shaft 42 but is made to revolve in unison therewith by splines 61 (see Fig. 4). One end of this shaft has a flange 62 which resides in the hollow part of head 47 (see Fig. 8). A plate 63 is bolted to the flange and a crown gear 64 is bolted to the plate. This gear is the die-roll. Obviously different die-rolls may be bolted to the plate, and if desired the plate may be changed. Making the die-roll and plate separately simplifies the work of making the die-roll. The shaft 60 extends to and is journaled in a bearing 65, being adapted to rotate and slide longitudinally therein. An arm 66 is loosely mounted on the shaft, the hub 67 thereof lying against bearing 65. The opposite end of the hub has two projections 68, one of which is visible in the drawings. These projections lie between complementary projections on a collar 69, also loosely mounted on shaft 60, this collar being allowed to slide parallel to the axis of the shaft but prevented from rotating by a slotted arm 70, which lies on a pad formed on the base 25 and is retained in position by bolts 71. The collar bears against a ball thrust bearing 72, one element whereof is threaded and screwed on the shaft and held in position by a jam nut 73. The sides of the projections 68 are oblique and the projections on collar 69 have complementary obliquity, so that when the arm 66 is rocked upward these oblique sides act as cams and move the shaft 60 longitudinally. In view of this function the hub 67 will hereinafter be referred to as a pressure cam. A compression spring 74 opposes this cam and tends to move the shaft in the opposite direction.

A plunger 80 is arranged to move longitudinally in shaft 60 and is also free to rotate therein. The plunger is moved longitudinally by an arm 81, pressure cam 82, non-rotatable collar 83, and thrust bearing 84 in the same manner as is shaft 60, and is moved in the opposite direction by the compression spring 85. The plunger is also movable manually by means of a lever 86 which operates in a grooved collar 87 interposed between the collar 83 and thrust bearing 84. The left hand end of the plunger is supported in a bearing 88.

The blank carriage comprises a plate 90, bearings 91 and shaft 92. The plate 90 lies on base 25 and is arranged to swing on a pivot 93 the axis of which passes through the axis of the gear 49 and coincides with the pitch-plane of said gear. The axis of shaft 92 lies in the same plane as the axis of the gear 49. T slots are provided in the base to receive the heads of bolts 94 whereby plate 90 may be secured in any desired position about the pivot 93. Set screws 95 are screwed into the end of the plate in such position that their heads bear against a flange 96 on the base and relieve the pivot 93 of strain. A graduated scale 97 is formed on the flange 96 and the plate carries an index 98, by which to set the carriage at any desired angle with reference to the die-roll axis. The end of shaft 92 carries a flange 99, which bears against the end of bearing 91, and a bevel gear 100 is bolted to the flange. This gear is enmeshed with the crown gear 49 and these gears will hereinafter be called timing gears. A blank holder (see Fig. 8) is bolted to gear 100, comprising in the present instance a plate 101 and ring 102. Together they form a receptacle the shape of the blank, indicated in this view by 103. The blank is pressed into the receptacle or holder by a circular block 104 against which the end of the ram 80 bears when it is moved forward by the pressure cam 82.

The following brief explanation of bevel gears will make what follows more easily understood: The teeth of bevel gears are constructed on imaginary pitch cones in the same way that the teeth of spur gears are constructed on imaginary pitch cylinders. The pitch cones of a pair of bevel gears would, if mounted on shafts in place of the bevel gears, drive each other by frictional contact in the same velocity ratio as given by the bevel gears themselves. The angle formed by the axis and one side of the pitch cone is called the pitch cone angle, and the sum of the two pitch cone angles equals the center angle. The center angle equals the angle formed by the axes of the cones, measured on the side on which the contact between the cones takes place. The pitch diameter is the diameter of the base of the cone, and since the pitch of a bevel gear is measured on a circle of the same diameter, "pitch circle" will be understood to mean a circle of the same diameter as the base of the cone. The pitch cone radius is the distance from the apex of the cone to the perimeter of its base. Treating the pitch circle as the perimeter of a plane, this imaginary plane will hereinafter be called the pitch plane of the gear.

The most common form of bevel gear is one in which the pitch cone angle is less than 90 degrees. The timing gear 100 is of this type, while the timing gear 49 is of a rarer type, the pitch cone angle being 90 degrees. This type of gear is called a crown gear, and although the term "pitch cone angle" is used and will be hereinafter used in referring to the angle formed by the axis and the pitch cone, the pitch cone of a crown gear is in fact a plane and coincides with what has already been referred to as the pitch plane. The pitch diameter and the outside diameter of a crown gear are the same, while in any other kind of bevel gear the outside diameter is larger than the pitch diameter. Moreover, the pitch of the teeth is the same at the extremities of the addenda or at the bases as on the pitch-line. These characteristics being similar to those which distinguish a rack from a spur gear, a crown gear is also known as a circular rack.

Referring again to Fig. 8 the ram 80 is seen to have a socket 105 in its end, receiving an extension 106. The end of this extension is a circular plane and coincides with the imaginary pitch-plane of gear 49. The outside of block 104 is conical and coincides with the imaginary pitch cone of gear 100. Therefore, the block 104 rolls upon the end of the extension 106 just as the pitch-cone of gear 100 rolls upon the pitch-plane of gear 49. The block 104 is secured to the extension 106 by a ball-and-socket joint. The ball 107 is carried by a stem 108 which is drawn inward by a compression spring 109. The block 104 is constantly held in a position which will enable it to engage the blank without guidance, by a supporting block 110 which fills the space between its conical back and the plane of the extension 106 and keeps the other side of the cone in contact with the plane. This supporting block is carried on the end of an arm 111 which is arranged to slide in a guide 112 carried by the base 25. The arm has a lug 113 lying in an annular groove 114 in the extension 106, whereby it is moved in unison with the ram so as to enable the block 110 to maintain its position whatever the position of the ram may be. The block 110 may extend downward and under the block 104 to any point necessary for proper support of the latter. The ring 102 encircles the outside of the tooth receiving part of the blank and acts as a shroud. In like manner the circular block 104 shrouds the inner part of the blank. Carrying the latter on the plunger disposes of what would otherwise be a troublesome problem; that of placing the blank between and removing it from the shrouds.

The timing wheel 34 carries two rings, 120 and 121, which are called controlling cams, by which the arms 81 and 66 respectively are operated. These rings are illustrated diagrammatically in Figs. 14 and 15, and for the purpose of simplifying the explanation they are represented by arrows as moving in opposite directions, which in a sense they do, since the arms operate on opposite sides of the timing wheel. When the machine is at rest the roller 81A lies in the recess 120A and when the incline or cam 120B engages the roller it lifts the arm 81 rather abruptly until the roller reaches the incline or cam 120C, and in doing this it causes the pressure cam 82 to move the collar 83 forward a certain distance. This pressure cam is diagrammatically illustrated in Fig. 16 and it is there seen that the coacting surfaces comprise respectively abrupt inclines 82A and 83A, and shorter but less abrupt inclines 82B and 83B. The incline 120B moves the arm sufficiently to carry the incline 82A past incline 83A and bring the inclines 82B and 83B into action. This moves the ram far enough to bring the circular block into close proximity to the blank which has been inserted in the holder. The incline 120C then lifts the arm farther but more slowly and before the roller reaches the level portion of the ring the arm will have moved far enough to bring the plane 82C under the plane 83C. The comparatively easy incline 120C and inclines 82B and 82C afford ample power to press the blank firmly into the holder. If desired the plate 101 may have radial ribs 115 adapted to sink into the blank and prevent it turning in the holder.

The roller 66A normally lies in recess 121A, and toward the latter part of the blank clamping operation the incline 121B engages this roller and lifts arm 66, operating the pressure cam 67 and moving shaft 60 toward the blank. Fig. 16 illustrates the pressure cam 67 as well as it does 83 and it is to be understood that by the time the roller has reached the top of incline 121B the abrupt inclines corresponding to 82A and 83A will have completed their work and the smaller inclines, corresponding to 82B and 83B, will have started into action. The line X—X indicates the relative timing of the operations. By the time the center of roller 81A reaches this line the roller 66A will have nearly reached the top of incline 121B and through the operation of the pressure cam 67 the die roll will have been moved into close proximity to the blank. The long incline 121C now continues moving the pressure cam 67, which completes its work and its planes 67C move onto the planes 69C of collar 69 (see Fig. 1). It is these planes, therefore, which fix the position of the die-roll at the end of the operation. Shortly before the timing wheel completes its revolution the decline 121D arrives under roller 66A and allows the arm 66 to return to its normal position, the spring 74 then moving the shaft 60 back and withdrawing the die-roll. Immediately after the die-roll is withdrawn the decline 120D arrives under roller 81A and allows the arm 81 to resume its normal position, the roller resting in recess 120A. About the time the roller 81A starts down the decline 120D the lug 35 engages roller 36 and throws out the clutch.

When the operator inserts a blank he may if he desires move the circular block 104 up to the blank with lever 86, and for the purpose of holding the block in this position until the pressure cam 82 gets into action a pawl 122, pivoted to the base 25, drops behind the lever (see Fig. 2). This facilitates uniformity in the treatment of blanks as it enables the operator to get the machine all ready so he can start it the instant the blank attains the desired temperature. The blank is heated to a higher than rolling temperature, and after it is in place in the holder the operator watches its color change, having nearby if desired some object of the required color, and when the blank attains this color he throws in the clutch. By this method a high degree of uniformity is attained in the product, since from the time the clutch is thrown in each blank automatically receives exactly the same treatment. When the blank is finished the pawl 122 prevents the spring 85 withdrawing the block 104 until the operator is ready to receive the blank. If the blank sticks in the holder it is forced out with a bar 123 which slides through shaft 92. This bar is operated with a lever 124.

The timing gear 49 and die-roll 64 are universal in that they may be used to roll any bevel gear of the radius and pitch of the latter, from a pinion having the fewest possible teeth to a gear having the greatest number of teeth possible without its becoming a crown gear. It is necessary, however, to provide a timing gear 100 having the same number of teeth that the blank is to have. The die-roll is universal also in that it is capable of rolling standard teeth; i. e., teeth whose addenda and dedenda are equal, or teeth with unequal addenda and dedenda. Fig. 18 shows diagrammatically a pinion with long addenda meshed with a gear having short addenda. From what has been said it will be understood that the teeth of the timing gear 49 are constructed on an imaginary pitch-plane, while those of the timing gear 100 are constructed on an imaginary pitch-cone, and that the teeth of these gears are so formed as to cause the cone to roll on the plane just as though they were real and rolling together without slipping. The blank becomes in effect a continuation of the gear 100 whose pitch-cone is also the pitch-cone of the blank. That is, an imaginary cone within the blank rolls upon the pitch-plane of gear 49 as though they were real and rolling together without slipping. This being the case it is evident that the portion of a blank tooth outside of this cone is addendum and the portion inside of the cone dedendum, and it is equally evident that the relative length of the addendum and dedendum depends upon the position of the die-roll with reference to the pitch-plane of gear 49 at the time the planes 67C bear on planes 69C. If just half of the die-roll teeth crosses the pitch-plane the blank teeth will be standard; if more than half crosses the blank will have teeth with short addenda; if less the blank teeth will have long addenda. This can be regulated by screwing the thrust bearing 72 one way or the other on shaft 60. The position of the thrust bearing on the shaft may also be varied to compensate for wearing of the die and to permit dies of various thicknesses to be used. No change is necessary in the timing gears to effect this variation in the kind of teeth formed on the blank.

Shrouds confining the toothed portion of the blank force the metal into the spaces between the die-roll teeth and help to insure perfect teeth on the blank. The preferred type of shroud is shown in Fig. 8 and has been described. A somewhat similar type is shown in Fig. 9. In both of these only the active part of the die-roll is between the shrouds, which affords opportunity for removal of any forging scale which may have lodged on the die. In Fig. 10 the end of the plunger is enlarged and bears directly upon the blank, at the same time shrouding the portion of the blank which is being acted upon. In Fig. 11 the inner part of the die is shrouded and the outer part of the blank. In Fig. 12 the inner part of the blank is shrouded by a detachable circular block 130 against which an extension 131 carried by the plunger 80 bears. The end of the extension is a plane which coincides with the pitch-plane and the block is conical. The blanks shown in Figs. 9 and 12 are rings and are removed from the holder by pins 132 carried by a disk 133. If desired the disk may be attached to the bar 123 by a screw as in Fig. 9. In Fig. 13 the die-roll is shrouded.

In Fig. 7 a manual blank clamping device is shown. The blank is inserted in a holder 135 carried on the end of shaft 92. An arbor 136 formed on the end of a rod 137 which slides in the shaft passes through the blank and enters a plate 138 mounted to rotate on an arm 139, a ball thrust bearing 140 being interposed. The arm 139 is carried by a sliding plate 141 which is mounted in guides 142 carried by the plate 90. The plate is connected by a right and left hand screw coupling 143 to a link 144; the other end of the link is attached to a link 145, this link in turn being pivoted at 146 to the plate 90. Links 144 and 145 form a toggle which is operated by a lever 147 rigidly secured to link 145. The rod 137 is connected at 148 to plate 90 by a toggle composed of links 149 and 150, and the knuckle of this toggle is connected by a link 151 to link 145 so it will be operated in unison with the toggle 144-145. When lever 147 is operated the plate 138 and arbor 136 are moved in opposite directions and, obviously, the toggles give very great power with which to clamp a blank.

In Fig. 17 the timing gear 49 and die-roll 64 are rigidly mounted on a shaft which is journaled in a bearing 160 carried by a plate 161. This plate is pivoted to the base of the machine (not seen) at 162, the axis of the pivot passing through the pitch-plane of gear 49 at the periphery of said gear. The blank is carried by a suitable holder on a shaft journaled in a bearing 163 which is pivoted to the base of the machine (not seen) at 164 and is driven by a belt on pulley 165 at the other end of the shaft. The timing gear 100 is fixed to the shaft and is enmeshed with gear 49 by swinging the bearing 163 on its pivot, after which the bearing is secured to the base by bolts 166. The plate 161 is moved by a hand wheel 167 and is stopped by a set screw 168 when the pitch-plane of the die-roll and gear 49 reaches a point in line with the axis of pivot 164.

Another manually operated machine is illustrated in Figs. 19 and 20, where the timing gear 79 is rigidly secured to a sleeve 175 mounted to rotate in a longitudinally fixed bearing 176, said bearing in turn being arranged to bolt to a base (not shown). The die-roll 64 is mounted on a shaft 177 arranged to move longitudinally in sleeve 175 and compelled to rotate in unison with the sleeve by a spline 178. Longitudinal motion is imparted to shaft 177 by means of a hand operated screw 179. The timing gear 79 meshes with the timing gear 100, which is mounted on a shaft 180 arranged to rotate in a bearing 181. The gear 100 is provided with a recess to receive the blank, which is held therein by a plate 182 and bolt 183, a portion only of which is shown. Shaft 180 is driven by means not shown and it is evident that the gears 79 and 100 maintain synchronous relations between the teeth on the die-roll and the teeth it is forming on the blank.

Although I have disclosed numerous variations from the preferred embodiment of my invention it is not to be inferred that its application is limited to said embodiment and variations. It is limited only by the scope of the appended claims.

Having described my invention in such terms as to enable any one skilled in the art to which it appertains to make and use it, I claim:

1. In a machine for rolling gears, a toothed die-roll whose pitch diameter and outside diameter are equal, means for mounting a blank with a portion of its working face contiguous to the working face of the blank, means for imparting relative motion between the die-roll and blank whereby other portions of their working faces are brought successively into similar contiguity, and means for moving the die roll longitudinally and causing its teeth to sink into and form teeth on the blank.

2. In a machine for rolling gears, a toothed die-roll whose pitch diameter and outside diameter are equal, means for mounting a blank with a portion of its working face contiguous to the working face of the die-roll, means for rotating the die-roll and blank, and means for moving the rotating die-roll longitudinally and causing its teeth to sink into and form teeth on the blank.

3. In a gear rolling machine, a toothed die-roll whose pitch diameter and outside diameter are equal, means for supporting a blank, means for rotating the die-roll and blank, means for moving the die-roll longitudinally and pressing its teeth into the blank to form teeth thereon, and means for maintaining synchronous relations between the die-roll teeth and the teeth they are forming on the blank.

4. In a gear rolling machine, means for supporting a blank, a toothed die-roll whose pitch-line and addendum-line are equal, means for rotating the die-roll and blank, and means for moving the die-roll longitudinally and pressing it against the blank to form teeth thereon.

5. In a gear rolling machine, means for supporting a blank, a toothed die-roll whose pitch-line and addendum-line are equal, means for rotating the die-roll and blank, means for moving the die-roll longitudinally and pressing it against the blank to form teeth thereon, and means for maintaining synchronous relations between the die-roll teeth and the teeth on the blank.

6. In a gear rolling machine, means for supporting a blank, a toothed die-roll whose pitch-line and addendum-line are equal, means for moving the die-roll longitudinally and pressing it against the blank and means for imparting relative movement between the die-roll and blank whereby the die-roll is caused to roll on the face of the blank.

7. In a gear rolling machine, means for supporting a blank, a toothed die-roll whose pitch-line and addendum line are equal, means for moving the die-roll longitudinally and pressing it against the blank, means for imparting relative movement between the die-roll and blank whereby the die-roll is rolled on the face of the blank and teeth formed thereon, and means for maintaining synchronous relations between the die-roll teeth and those it is forming on the blank.

8. In a gear rolling machine, means for supporting a blank, a toothed die-roll whose pitch-line and addendum-line are equal, means for rotating the die-roll and blank and means for producing movement of approach between the die-roll and blank, said approach being in a direction parallel to the die-roll axis.

9. In a gear rolling machine, means for supporting a blank, a die roll, means for causing the die-roll to roll teeth on the blank, and automatic means coöperatively associated with the last mentioned means, for terminating the rolling operation when it has continued for a given length of time.

10. In a gear rolling machine, a die-roll, means for causing it to have rolling engagement with a blank and roll teeth thereon, and means coöperatively associated with the aforesaid means for causing the die-roll to continue said rolling engagement for a limited time after the teeth have been formed, without materially changing the form of the teeth.

11. In a gear rolling machine, a die-roll, means for causing it and a blank to simultaneously have rolling engagement with and approach each other for a limited time, and means coöperatively associated with the aforesaid means for suspending the movement of approach and continuing the rolling engagement alone for a limited time.

12. In a gear rolling machine, a die-roll, means for supporting a blank, means for producing relative movement of approach therebetween whereby to press the die-roll and blank together, means independent of their contact for causing the die-roll to roll on the blank, and means for causing said relative movement of approach to occur at any predetermined velocity relative to the velocity of said rolling motion between the die-roll and blank.

13. In a gear rolling machine, a die-roll, means for supporting a blank, means for producing relative movement of approach therebetween whereby to press the die-roll and blank together, means independent of their contact for causing the die-roll to roll on the blank, and automatic means for relieving the pressure between the die-roll and blank after the teeth of the former have sunk to a predetermined depth in the blank.

14. In a gear rolling machine, a die-roll, means for supporting a blank, means for producing relative movement of approach therebetween whereby to press the die-roll and blank together, said means completing the movement of approach in a predetermined time, means independent of their contact for causing the die-roll to roll on the blank, and automatic means for separating the die-roll and the blank.

15. In a gear rolling machine, a die-roll, means for supporting a blank, means independent of the contact for rotating the die-roll and blank, means for moving the die-roll and pressing it against the blank, and automatic means for withdrawing the die-roll after its teeth have penetrated the blank to a predetermined depth and it has remained enmeshed to said depth and rotated therewith for a predetermined length of time.

16. In a gear rolling machine, a circular toothed die, a blank-holder, means for clamping a blank therein, means for rolling the die on the blank, means for producing movement of approach, whereby to press the die teeth into the blank concurrently with said rolling operation, whereby to form teeth on the blank, means for separating the die and blank after the teeth are formed, and means for controlling and timing the several operations, whereby (a) the operation of clamping the blank is performed during a period of time equal to that which would be required for the die to traverse the blank a given number of times; (b) the die teeth are made to penetrate the blank to a predetermined depth while the die traverses the blank a given number of times; (c) the die is made to traverse the blank a given number of times with its teeth enmeshed to said depth, and (d) the die and blank are separated.

17. In a gear rolling machine, a die-roll, a blank holder, means for rotating them, a controlling and timing element, and means controlled by said element for successively (a) clamping a blank in the holder, (b) bringing the die into engagement with and causing its teeth to sink to a predetermined depth in the blank, (c) causing the die and blank to rotate for a time with their teeth enmeshed to said predetermined depth, (d) separating the die and blank, (e) releasing the blank so it may be removed from the holder, and (f) stopping rotation of the blank holder; each of said operations, a to f inclusive, being performed while the blank rotates a given number of revolutions.

18. In a gear rolling machine, a toothed die, means for supporting and rotating a blank, means for pressing the die teeth into the rotating blank, thereby forming teeth on the blank, means for separating the die and blank, and means for controlling and timing said operations, whereby the die teeth are made to penetrate the blank to a predetermined depth while the blank rotates a given number of revolutions, where they are allowed to remain while the blank rotates a given number of revolutions, after which the die is withdrawn.

19. In a gear rolling machine, a toothed die, a rotatable blank-holder, means for clamping a blank in the holder, means for pressing the die teeth into a blank clamped in the rotating holder, whereby to form teeth on the blank, and means for controlling and timing said operations, whereby each is made to occur while the blank rotates a given number of revolutions.

20. In a gear rolling machine, means for supporting a blank, a die-roll, means for rotating both, and means for pressing the die-roll and blank together, the pressure being substantially parallel to the axis of the die-roll.

21. In a gear rolling machine, means for supporting a blank, a die-roll, means for rotating both, means for pressing the die-roll and blank together, the pressure being substantially parallel to the axis of the die-roll, and a bearing behind the portion of the die-roll which is in contact with the blank.

22. In a gear rolling machine, a die-roll, means for supporting a blank, means for rotating the die-roll and blank supporting means at an invariable velocity ratio, means for producing relative movement of approach therebetween whereby the die-roll and blank are pressed together and teeth formed on the blank, and shrouds arranged concentric to the blank for the purpose of confining portions of the displaced metal of the blank not directly acted upon by the die-roll.

23. In a gear rolling machine, a die-roll, means for supporting a blank, means for rotating the die-roll and blank supporting means at a fixed velocity ratio, means for producing relative movement of approach therebetween whereby the die-roll and blank are pressed together, and shrouds arranged concentric to the blank to prevent displacement of metal save toward the die-roll.

24. In a gear rolling machine, a die-roll, means for supporting a blank, means for rotating the die-roll and blank, means for producing relative movement of approach therebetween whereby the die-roll and blank are pressed together, a shroud arranged concentric to the blank to prevent lateral displacement of metal, and means for maintaining uniform velocity ratio between the die-roll and shroud.

25. In a bevel gear rolling machine, a die-roll adapted to form the teeth of bevel gears, means for supporting a bevel gear blank, means for rotating the die-roll and blank, means for producing relative movement therebetween whereby to form bevel gear teeth on the blank, and shrouds to confine the blank and prevent displacement of metal save toward the die-roll.

26. In a machine for rolling bevel gears, a die-roll adapted to roll teeth on a bevel gear, means for supporting a bevel gear blank, means for rotating the die-roll and blank, means for producing relative movement therebetween whereby the blank and die-roll are pressed together, and shrouds between which the die-roll teeth are located while they act upon the blank, said shrouds being so arranged as not to confine the inactive teeth of the die-roll, so that particles of scale or other substances can be thrown off by centrifugal force.

27. In a gear rolling machine, a die-roll, means for supporting a blank, means for producing relative movement of approach therebetween whereby to press the die-roll and blank together, means for imparting relative movement therebetween whereby to cause the die-roll to roll on a blank carried by the blank supporting means, said means being independent of contact between the die-roll and blank, and a shroud arranged concentric to the blank to prevent lateral displacement of metal.

28. In a machine for rolling bevel gears, a blank holder having a rim to shroud the outer tooth-receiving part of the blank, a circular block pressing the blank into the holder and having a rim to shroud the inner tooth-receiving portion of the blank, a die-roll, and means for causing the die-roll to enter the space between said shrouds and roll teeth upon the face of the blank.

29. In a machine for rolling bevel gears, a blank holder having a rim to shroud the outer tooth-receiving part of the blank, a circular block adapted to press the blank into the holder, said block having a rim to shroud the inner tooth-receiving portion of the blank, a die-roll, means for causing the die-roll to enter the space between said shrouds and roll teeth on the blank, and a plunger movable parallel to the axis of the die-roll whereby the circular block is pressed against the blank.

30. In a machine for rolling bevel gears, a rotatable blank holder having a rim to shroud the outer tooth-receiving portion of the blank, a circular block adapted to press the blank into the holder, said block having a rim to shroud the inner tooth-receiving part of the blank, a die-roll, means for causing the die-roll to enter the space between the shrouds and roll teeth on the blank, and a ball-and-socket centering device for the circular block.

31. In a machine for rolling bevel gears, a blank holder having a rim to shroud the outer tooth-receiving portion of the blank, a circular block adapted to press the blank into the holder, said block having a rim to shroud the inner tooth-receiving part of the blank, a die-roll, means for causing the die-roll to enter the space between the shrouds and roll teeth on the blank, a plunger movable parallel to the axis of the die-roll whereby the circular block is pressed against the blank, and a ball-and-socket connection between the plunger and block.

32. In a machine for rolling bevel gears, a blank holder having a rim to shroud the outer tooth-receiving portion of the blank, a circular block adapted to press the blank into the holder, said block having a rim to shroud the inner tooth-receiving part of the blank, a die-roll, means for causing the die-roll to enter the space between the shrouds and roll teeth on the blank, and a plunger movable parallel to the axis of the die-roll to press the block against the blank, said plunger having rolling contact with the block.

33. In a machine for rolling bevel gears, means for supporting a blank, comprising a blank holder and a circular block, the former to receive and the latter to keep the blank in the former, each having a rim to shroud the tooth-receiving part of the blank, means for pressing the block against the blank, a die-roll, and means for causing the die-roll to roll teeth upon the shrouded portion of the blank.

34. In a machine for rolling bevel gears, means for supporting a blank, comprising a blank holder and a circular block, the former to receive and the latter to keep the blank in the former, each having a rim to shroud the tooth-receiving part of the blank, a plunger movable along a line angular to the axis of the blank-holder and block, to press the block against the blank; a die-roll and means for causing it to roll teeth on the blank.

35. In a machine for rolling bevel gears, means for supporting a blank, comprising a blank-holder and a circular block, the former to receive and the latter to keep the blank in the former, each having a rim to shroud the tooth-receiving part of the blank, a plunger movable along a line angular to the axis of the blank-holder and block to press the block against the blank, said plunger having rolling engagement with the block; a die-roll and means for causing it to roll teeth on the blank.

36. In a machine for rolling bevel gears, means for supporting a blank, comprising a blank-holder and a circular block, the former to receive and the latter to keep the blank in the former, each having a rim to shroud the tooth-receiving part of the blank, a plunger movable along a line angular to the axis of the blank-holder and block to press the block against the blank, said block being attached to the plunger by a ball-and-socket device; a die-roll and means for causing it to roll teeth on the blank.

37. In a machine for rolling bevel gears, means for supporting a blank, comprising a blank-holder and a circular block, the former to receive and the latter to keep the blank in the former, a plunger movable along a line angular to the axis of the blank-holder and block to press the block against the blank, said plunger having rolling engagement with the block; a die-roll and means for causing it to roll teeth on the blank.

38. In a machine for rolling bevel gears, means for supporting a blank, comprising a blank-holder and a circular block, the former to receive and the latter to keep the blank in the former, a plunger movable along a line angular to the axis of the blank-holder and block to press the block against the blank, the block being attached to the plunger by a ball-and-socket device, and means for maintaining the block in approximately the required position with reference to the plunger when it is not in contact with a blank; a die-roll and means for causing it to roll teeth on the blank.

39. In a machine for rolling bevel gears, means for supporting a blank, comprising a blank-holder and a circular block, the former to receive and the latter to keep a blank in the former, a plunger movable along a line angular to the axis of the blank-holder and block to press the block against the blank, the block being attached to the plunger by a ball-and-socket device, and a supporting member mounted to move with the plunger and keep the block in approximately its correct angular position; a die-roll and means for causing it to roll teeth on the blank.

40. In a machine for rolling bevel gears, means for supporting a blank, comprising a blank-holder and a circular block, the former to receive and the latter to keep a blank in the former, a plunger movable along a line angular to the axis of the blank-holder and block to press the block against the blank, the end of the plunger and the block being so formed that they may have rolling engagement with each other, a ball-and-socket device for attaching the block to the plunger, and a supporting member arranged to maintain the block in approximately its correct position with reference to the plunger when the block is not in contact with the blank; a die-roll and means for causing it to roll teeth on the blank.

41. In a machine for rolling bevel gears, a blank holder, a die-roll, a member adapted to press a blank into the holder for the purpose of holding it firmly therein while teeth are being rolled on it, said member having a surface of the same form as the pitch-surface of the die-roll, and means for forcing said member toward the blank until said surface coincides with the pitch surface of the die-roll.

42. In a machine for rolling bevel gears, a blank holder, a die-roll, a member adapted to press a blank into the holder for the purpose of holding it firmly therein while teeth are being rolled on it, said member having a surface of the same form as the pitch-surface of the die-roll, a circular block interposed between said member and the blank, and means for forcing said member against the circular block and pressing said block toward the blank until the surface of said member coincides with the pitch-surface of the die-roll, the contacting surface of the block having the same form as the pitch-surface of the blank thus adapting the block and member to roll together substantially as the pitch-surfaces of the die-roll and blank roll together.

43. In a gear rolling machine, means for supporting a blank, a toothed die roll, means for rotating both at equal pitch-line velocity, and means for producing relative movement of approach, said means being adapted to continue the movement of approach until the pitch-line of the die and that of the blank have attained any desired relative position, even until they overlap.

44. In a gear rolling machine, means for supporting a blank, a toothed die roll having tapered converging teeth and adapted to roll teeth on a bevel gear, means for rotating the die roll and blank at equal pitch line velocity, and means for producing relative movement of approach, said means being adapted to continue the movement of approach until the pitch-lines have attained any desired relative position, even until they overlap.

45. In a gear rolling machine, means for supporting a blank, shrouds to confine the tooth-receiving part of the blank, a die-roll, means for moving the die-roll longitudinally to engage and press its teeth into the blank, and means for rotating the die-roll and blank.

46. In a gear rolling machine, means for supporting a blank, shrouds to confine the tooth-receiving part of the blank, a die-roll, means for moving the die-roll longitudinally to engage and press its teeth into the blank, means for rotating the die-roll and blank, and means for maintaining fixed velocity ratio between the die-roll and blank.

47. In a gear rolling machine, means for supporting a blank, shrouds to confine the tooth-receiving part of the blank, a die-roll, means for moving the die-roll longitudinally to engage and press its teeth into the blank, means for rotating the die-roll and blank, and means for maintaining synchronous relations between the die-roll teeth and the teeth it is forming on the blank.

48. In a machine for rolling bevel gears, a blank holder having a rim to shroud the outer circumference of the tooth receiving portion of a blank, a plunger movable with reference to the blank holder, and a circular block carried by the plunger and adapted to be pressed against the blank to hold it in the blank holder while teeth are being rolled upon the blank.

49. In a machine for rolling bevel gears, a blank holder having a rim to shroud the outer circumference of the tooth receiving portion of a blank, a plunger movable with reference to the blank holder, and a circular block carried by the plunger and adapted to be pressed against the blank to hold it in the blank holder while teeth are being rolled upon the blank, said block being adapted to support the inner circumference of the portion of the blank which is being acted upon by the die-roll.

50. In a gear rolling machine, a crown die-roll, means for supporting a blank, and means for moving the die-roll longitudinally and causing it to roll teeth on the blank.

51. In a gear rolling machine, a crown die-roll, means for supporting a blank, means for rotating the die roll, and means for moving the rotating die-roll longitudinally and pressing it against the blank.

52. In a gear rolling machine, a crown die-roll, means for supporting a blank, means for rotating the die-roll and blank, and means for moving the die-roll longitudinally and pressing it against the rotating blank.

53. In a gear rolling machine, a crown die-roll, means for supporting a blank, gears whereby the die-roll and blank are made to rotate at equal pitch-line velocity, and means for moving the die-roll longitudinally and pressing it against the blank.

54. In a gear rolling machine, a crown die-roll, means for supporting a blank, means for moving the die-roll longitudinally and causing it to roll teeth on the blank, and means for maintaining synchronous relations between the teeth on the die-roll and those which are being formed on the blank.

55. In a gear rolling machine, a crown die-roll, means for supporting a blank, means for moving the die-roll longitudinally and pressing it against the blank, and means for rotating the die-roll and blank, said means maintaining synchronous relations between the die-roll teeth and those which are being formed on the blank.

56. In a gear rolling machine, a pair of gears rotatably mounted with their teeth enmeshed, a blank-holder mounted to rotate in unison with one of said gears, a crown die-roll mounted to rotate upon the same axis as and in unison with the other gear, and means for moving the die-roll longitudinally toward a blank mounted in the blank-holder.

57. In a gear rolling machine, a pair of gears rotatably mounted with their teeth enmeshed, a blank-holder mounted to rotate in unison with one of said gears, a crown die-roll mounted to rotate upon the same axis as and in unison with the other gear, and means for moving the die-roll longitudinally with reference to said gear and pressing it against a blank in the blank-holder.

58. In a machine for rolling bevel gears, a pair of gears rotatably mounted with their teeth enmeshed, a blank-holder mounted to rotate in unison with one of said gears, a die-roll mounted to rotate in unison with the other gear, means for producing relative movement of approach whereby the die-roll and blank are brought into contact and teeth formed on the blank, and means for insuring that said movement of approach shall be perpendicular to the pitch-cone radii.

59. In a machine for rolling bevel gears, a blank-holder, a rotatably mounted die-roll, and a pivotal connection between the blank-holder and die-roll mounting, the axis of said pivot being perpendicular to the axis of the blank and crossing it at the apex of the pitch cone of the blank.

60. In a machine for rolling bevel gears, a blank-holder, a rotatably mounted die-roll, a pivotal connection between the blank-holder and die-roll mounting, said pivot being so positioned that its axis passes perpendicular to the axis of the blank through the apex of the pitch-cone of the blank, and means for fixing the relative positions of the blank holder and die-roll mounting so the blank and die-roll axes will form any desired angle.

61. In a machine for rolling bevel gears, a blank-holder, a rotatably mounted die-roll, a pivotal connection between the blank-holder and die-roll mounting, said pivot being so positioned that its axis passes perpendicular to the axis of the blank through the apex of the pitch-cone of the blank, and a graduated scale and index whereby to determine the angularity of the die-roll and blank axes.

62. In a machine for rolling bevel gears, a base, a die-roll journaled thereon and arranged to move longitudinally with reference to the base, and a blank-holder journaled in a swiveled bearing with its axis in the same plane as that of the die-roll, the swivel axis passing perpendicularly through the blank-holder and die-roll axes.

63. In a machine for rolling bevel gears, a base, a die-roll journaled thereon, and a blank-holder journaled in a swiveled bearing with its axis in the same plane as that of the die-roll, the swivel axis passing perpendicularly through the blank-holder axis.

64. In a machine for rolling bevel gears, a base, a die roll journaled thereon, a blank-holder journaled in a swiveled bearing with its axis in the same plane as that of the die-roll, the swivel axis passing perpendicularly through the blank-holder axis, means for rotating the die-roll and blank-holder, and means independent of the swivel for producing relative movement of approach whereby the rotating die-roll is made to form teeth on the blank, said movement of approach being so arranged that at the time the blank is finished the swivel axis will pass through the point where the axis of the die-roll crosses the axis of the blank.

65. In a machine for rolling bevel gears, a base, a rotatable die-roll mounted thereon, a blank-holder journaled in a swiveled bearing with its axis in the same plane as that of the die-roll, the swivel axis passing perpendicularly through the axis of the blank-holder, means for rotating the die-roll and blank-holder, and means for moving the rotating die-roll toward the blank whereby to cause it to form teeth thereon.

66. In a machine for rolling bevel gears, a base, a rotatable die-roll mounted thereon, a rotatable blank-holder journaled in a swiveled bearing with its axis in the same plane as that of the die-roll, the swivel axis passing perpendicularly through the axis of the blank-holder and said plane; means for moving the die-roll into contact with and causing it to form teeth on a blank in the holder, and means for fixing the swiveled bearing in any desired position.

67. In a machine for rolling bevel gears, a base, a rotatable die-roll and a rotatable blank-holder mounted thereon, a swivel device whereby the angle formed by the die-roll and blank-holder axes may be varied, the axis of the swivel passing perpendicularly through said axes at the point where they cross when rolling of the blank is completed, and means for fixing the angularity of said axes at a required degree.

68. In a machine for rolling bevel gears, a base, a timing gear mounted to rotate thereon, a die-roll mounted to rotate upon the same axis and in unison with the timing gear, a blank-holder mounted in a swiveled bearing, a timing gear removably mounted to rotate upon the same axis and in unison with the blank holder, the axis of the swivel passing perpendicularly through the axis of the blank-holder, and being so located that by swinging the blank-holder thereon its timing gear will be brought into working relationship with the die-roll timing gear, and means for fixing the swiveled bearing in a required position.

69. In a machine for rolling bevel gears, a base, a pair of journals carried thereby, one of which is arranged to swing upon a swivel whose axis passes perpendicularly through its axis, one of said journals carrying a die-roll and the other a blank-holder, means for fixing the swiveled journal in a desired position with reference to the other journal, and means for causing the die-roll to form teeth upon a blank in the blank-holder.

70. In a machine for rolling bevel gears, a base, a pair of journals carried thereby, one of which is arranged to swing upon a swivel whose axis passes perpendicularly through its axis, one of said journals carrying a die-roll and the other a blank-holder, a timing gear mounted upon each journal, means for fixing the swiveled journal in a position where its timing gear meshes with the other gear, and means for causing the die-roll to engage and form teeth on a blank in the die-holder.

71. In a machine for rolling bevel gears, a base, a pair of journals carried thereby, one of them being arranged to swing on a swivel, the axis of which passes perpendicularly through the journal axes at the point where they cross, and means for fixing the swiveled journal in a desired position with reference to the other journal; a die-roll carried by one journal, a blank-holder carried by the other, and means for moving the die-roll longitudinally and causing it to roll teeth on a blank in the holder.

72. In a machine for rolling bevel gears, a base, a pair of journals carried thereby, one of them being arranged to swing on a swivel, the axis of which passes perpendicularly through the journal axes at the point where they cross, a timing gear mounted upon each journal, and means for fixing the swiveled journal in such position that said gears are properly enmeshed; a die-roll carried by one journal, a blank-holder carried by the other, and means for moving the die-roll longitudinally and causing it to roll teeth on a blank in the holder.

73. In a machine for rolling bevel gears, a base, a timing gear journaled thereon; a die-roll mounted concentric to and arranged to rotate in unison with said gear, but movable longitudinally with reference thereto; a second timing gear and a blank-holder united and mounted to rotate in a swiveled bearing on said base with the gears enmeshed, the axis of said swivel passing perpendicularly through the gear axes at the point where they cross; means for fixing the swiveled bearing at a point where the gears are properly enmeshed, means for rotating the gears, and means for moving the die-roll longitudinally and pressing it against a blank in the holder.

74. In a machine for rolling bevel gears, a base, a crown gear journaled thereon, a crown die-roll mounted concentric to and arranged to rotate in unison with said gear, but movable longitudinally with reference thereto; a bevel gear and a blank-holder united and mounted to rotate in a swiveled bearing on the base with the gears enmeshed, the axis of the swivel passing perpendicularly through the axes of the gears at the point where they cross, which point is also coincident to the pitch plane of said crown gear; means for fixing the swiveled bearing at a point where the gears are properly enmeshed, means for rotating the gears, and means for moving the die-roll longitudinally and pressing it against a blank in the blank-holder.

75. In a machine for rolling bevel gears, a base, a crown gear journaled thereon, a crown die-roll mounted concentric to and arranged to rotate in unison with said gear, but movable longitudinally with reference thereto; a bevel gear and a blank-holder united and mounted to rotate in a swiveled bearing on the base with the gears enmeshed, the axis of the swivel passing perpendicularly through the axes of the gears at the point where they cross, which point is also coincident to the pitch plane of said crown gear; means for replacing either or both of the gears by others, means for fixing the swiveled bearing at a point where the gears are properly enmeshed, means for rotating the gears and means for moving the die-roll longitudinally and pressing it against a blank in the blank-holder.

76. In a machine for rolling bevel gears, a base, a crown gear journaled thereon, a crown die-roll mounted concentric to and arranged to rotate in unison with said gear, but movable longitudinally with reference thereto; a bevel gear and a blank holder united and mounted to rotate in a swiveled bearing on the base with the gears enmeshed, the axis of the swivel passing perpendicularly through the axes of the gears at the point where they cross, which point is also coincident to the pitch plane of said crown gear; means for fixing the swiveled bearing at a point where the gears are properly enmeshed, means for rotating the gears, and means for moving the die-roll longitudinally toward the blank holder until its pitch plane coincides with that of the crown gear, said means being arranged to then discontinue movement of the die-roll though it continues to rotate.

77. In a machine for rolling bevel gears, a base, a crown gear journaled thereon, a crown die-roll mounted concentric to and arranged to rotate in unison with said gear, but movable longitudinally with reference thereto; a bevel gear and a blank-holder united and mounted to rotate in a swiveled bearing on the base with the gears enmeshed, the axis of the swivel passing perpendicularly through the axes of the gears at the point where they cross, which point is also coincident to the pitch plane of said crown gear; a graduated scale and index whereby to determine the angular position of the swiveled bearing, means for fixing the bearing at a selected angular position, means for rotating the gears, and means for moving the die-roll longitudinally and pressing it against a blank in the holder.

78. In a machine for rolling bevel gears, a base, a crown gear journaled thereon, a crown die-roll mounted concentric to and arranged to rotate in unison with said gear, but movable longitudinally with reference thereto; a bevel gear and a blank-holder united and mounted to rotate in a swiveled bearing on the base with the gears enmeshed, the axis of the swivel passing perpendicularly through the axes of the gears at the point where they cross, which point is also coincident to the pitch plane of said crown gear; a graduated scale and index whereby to determine the angular position of the swiveled bearing, bolts whereby to clamp the bearing to the base at a selected angular position, means for rotating the gears, and means for moving the die-roll longitudinally and pressing it against a blank in the holder.

79. In a gear rolling machine, a die-roll, a rotatable but otherwise fixed blank holder, means for causing the die-roll to form teeth on a blank in the holder, and a longitudinally movable rod with which to remove the blank from the holder.

80. In a gear rolling machine, a die-roll, a blank-holder, means for causing the die-roll to form teeth on a blank in the holder, a blank remover, and means independent of the aforesaid means for operating the blank remover and causing it to remove the blank from the holder.

81. In a gear rolling machine a die-roll, a blank-holder mounted on the end of a hollow shaft, means for causing the die-roll to form teeth on a blank in the holder, a rod in said hollow shaft, and means independent of the aforesaid means for moving the rod to knock the blank out of the holder.

82. In a gear rolling machine, a blank-holder, a die-roll mounted on a hollow shaft, a plunger movable longitudinally in said shaft, means for moving the plunger longitudinally and causing it to hold a blank in the holder, and means for moving the die-roll longitudinally, independently of the plunger, and causing it to form teeth on the blank.

83. In a gear rolling machine, a blank-holder, a die-roll mounted on a hollow shaft, a plunger movable longitudinally in the shaft, a pressure cam arranged to move the shaft and cause it to hold a blank in the holder, and a second pressure cam to move the die-roll and press it against the blank.

84. In a gear rolling machine, a blank-holder, a die-roll mounted on a hollow shaft, a plunger movable in the shaft, a pressure cam arranged to move the shaft toward and cause it to hold a blank in the blank-holder, a second pressure cam to move the die-roll and press it against the blank, and automatic means for operating the cams successively.

85. In a gear rolling machine, a blank-holder, a die-roll mounted on a hollow shaft, a plunger movable in the shaft, a pressure cam to move the shaft toward and cause it to hold a blank in the holder, a second pressure cam to move the die-roll and press it against the blank, means for operating the cams successively, and automatic means for withdrawing the die-roll and plunger when the blank is finished.

86. In a gear rolling machine, means for supporting a blank, a die-roll and means independent of its contact with the blank for rotating it to roll on the blank, and a pressure cam to press the die-roll and blank together, the altitude of said cam being such as to press the die-roll teeth into the blank to a predetermined depth.

87. In a gear rolling machine, means for supporting a blank, a die-roll and means for causing it to roll on the blank, a pressure cam to press the die-roll and blank together, and a controlling cam whereby the pressure cam is operated.

88. In a gear rolling machine, means for supporting a blank, a die-roll and means for rotating it, a pressure cam to move the die-roll and press it against the blank, a timing wheel arranged to rotate once while the die-roll rotates a given number of times, and a controlling cam carried thereby and arranged to operate the pressure cam and cause it to press the die roll into the blank while the timing wheel moves through a certain part of its cycle and control the withdrawal of the die-roll so it will be withdrawn during a certain part of said cycle.

89. In a gear rolling machine, a blank holder, a die-roll, a timing wheel, means for rotating said wheel and the die-roll at a definite relative velocity, and means controlled by the timing wheel for clamping a blank in the holder, bringing the die-roll into engagement with and causing it to form teeth on the blank, withdrawing the die-roll, releasing the blank and stopping rotation of the wheel and die-roll.

90. In a gear rolling machine, a blank holder, a die-roll, a timing wheel, means for rotating said wheel and die-roll at a definite relative velocity, and means controlled by the timing wheel for successively clamping a blank in the holder, bringing the die-roll into engagement with and causing it to form teeth on the blank and withdrawing the die-roll from the blank.

91. In a gear rolling machine, a die roll adapted to move into engagement with a blank and roll teeth upon it, a timing wheel, means for rotating the die-roll and timing wheel at a given relative velocity, a pressure cam for moving the die roll into engagement with and forcing it to form teeth on the blank, said cam having an extending arm whereby it is operated, and a controlling cam carried by the timing wheel, which at a given time during a cycle of the wheel moves said arm to operate the pressure cam.

92. In a gear rolling machine, a blank holder, a die-roll mounted on a hollow shaft, a pressure cam to move the die-roll toward the blank and a spring to move it back; a plunger in the hollow shaft, a pressure cam to move the plunger to clamp a blank in the holder, a spring to return the plunger, a timing wheel, means for rotating the wheel and the die-roll at a given relative velocity; controlling cams carried by the wheel which successively operate the plunger cam to clamp a blank in the holder, operate the die-roll cam to press the die-roll against the blank, release the die-roll cam and allow the spring to withdraw the die-roll, and release the plunger cam, allowing the spring to withdraw the plunger; and means for stopping the die-roll and timing wheel when the latter has completed its cycle.

93. In a gear rolling machine, means for supporting a blank, a rotary die for rolling teeth on the blank, and means for rolling teeth on the blank with said die whose addenda and dedenda have any desired relative length.

94. In a gear rolling machine, means for supporting a blank, a tooth-forming circular rack, and means for rolling teeth on the blank having any desired relative addendum and dedendum.

95. In a machine for rolling bevel gears, a die-roll, means for supporting a bevel gear blank, means for establishing any desired angularity between the axes of the die-roll and blank and for maintaining said angularity while teeth are being formed on the blank, means for producing relative movement between the die-roll and blank whereby to form teeth on the blank, and means for maintaining synchronous relations between the die-roll and blank teeth.

96. In a machine for rolling bevel gears, a toothed die-roll, means for supporting a bevel gear blank, means for producing relative movement of approach between the die-roll and blank while causing one to roll on the other, said movement of approach being perpendicular to the pitch-cone radius of the blank, and means for maintaining synchronous relations between the die teeth and the developing teeth on the blank.

97. In a gear rolling machine, means for supporting a blank, a die-roll having tapered converging teeth, means for imparting relative movement between the die-roll and blank whereby they are rolled against each other, and automatic means for producing relative movement of approach between them.

98. In a gear rolling machine, means for supporting a blank, a die-roll, means for imparting relative movement between the die-roll and blank whereby they are rolled against each other, and automatic means for moving the die-roll longitudinally to press it against the blank.

99. In a gear rolling machine, a support for a die-roll, means for moving said support to bring the die-roll into engagement with and press the die-roll teeth into the blank, and means for adjusting the relation of said support to said moving means so that with a given movement of said moving means the die-roll will be brought to a predetermined position with reference to the blank.

In testimony whereof I affix my signature in the presence of two subscribing witnesses.

HAROLD N. ANDERSON.

Witnesses:
R. W. Touzeau,
W. G. Niermann.